United States Patent [19]

Wieder et al.

[11] 4,354,812
[45] Oct. 19, 1982

[54] METHOD AND APPARATUS FOR MOLD TEMPERATURE CONTROL

[75] Inventors: Horst K. Wieder, Watertown; Klaus A. Wieder, Helenville; Joseph Haberkorn, Watertown, all of Wis.

[73] Assignee: CITO Products, Inc., Watertown, Wis.

[21] Appl. No.: 179,886

[22] Filed: Aug. 20, 1980

[51] Int. Cl.³ .............................................. B29F 1/08
[52] U.S. Cl. ................................... 425/144; 264/40.6
[58] Field of Search ...................... 425/144; 264/40.6

[56] References Cited

U.S. PATENT DOCUMENTS 3,583,467  6/1971  Bennett ........................... 425/144 X Primary Examiner—Thomas P. Pavelko
Attorney, Agent, or Firm—Isaksen, Lathrop, Esch, Hart & Clark

[57] ABSTRACT

A method and apparatus (10) is disclosed which provides automatic control of the temperature of a fluid cooled plastic mold (12) during successive injections of liquid plastic into the mold. The temperature of the mold (12) is sensed by a probe (18) which provides a signal indicative of the temperature of the mold. The signal from the probe (12) is compared by the apparatus with a selected control temperature signal indicative of the proper operating temperature of the mold. When the sensed temperature is above the control temperature, a solenoid operated control valve (50) is activated so that cooling fluid, such as ordinary tap water, is passed through cooling channels (13) in the mold. Flow of cooling fluid is shut off when the sensed temperature drops below the selected operating temperature. The apparatus (10) also includes an undertemperature signal light (54) which lights to inform the operator that the mold is below a minimum operating temperature; and an overtemperature alarm light (46) and a speaker (44) which are both activated to warn the operator when an unacceptable overtemperature in the mold is sensed.

19 Claims, 7 Drawing Figures

METHOD AND APPARATUS FOR MOLD TEMPERATURE CONTROL

TECHNICAL FIELD

The present invention relates to molds for casting thermoplastics in general, and, in particular, to a device for controlling the temperature of such a mold while it is in operation.

BACKGROUND ART

The prior art is generally cognizant of the need to disperse excess heat from molds used in the formation of molded, thermoplastic objects. Molten thermoplastic material is introduced into a mold and allowed to set or cure by cooling. Generally, the mold is cooler than the molten plastic and absorbs the heat that must be removed from the molten thermoplastic before it will set. Consequently, as a series of objects are molded successively, the temperature of the mold tends to increase.

It is generally desirable to maintain the temperature of the mold at a particular level found to be that which allows a plastic object being molded to exhibit the least possible amount of shrinkage and distortion during the setting or curing process. In any event, it is important to maintain the mold at a consistent operating temperature so as to provide for uniformity among the replications of the object being molded. It is also desirable to remove excess heat from the mold promptly after the molding of an object so as to more quickly prepare the mold for a subsequent introduction of molten plastic, thus increasing the efficiency of production possible by use of the mold.

The control of the temperature of a mold by circulating fluids through channels fashioned in the walls of the mold is known in the art. Conventionally, the fluid is heated to the desired ideal operating temperature and then is circulated through the mold before the first injection or "shot" of hot plastic is introduced. The temperature of the mold increases upon the introduction of molten plastic but is restored to the operating temperature by the continued circulation of considerable quantities of fluid, the temperature of which is maintained at the ideal operating temperature. The fluid is required to circulate substantially all the time that the mold is being used in making successive replications of the object molded.

DISCLOSURE OF THE INVENTION

The mold temperature controller for a fluid-cooled mold in accordance with the present invention includes means for sensing and conveying information about the temperature of the mold, means for responding to the information so conveyed by selecting and sending an appropriate control signal when the temperature sensed exceeds a selected maximum level, and a signal responsive fluid regulator adapted to be connected in the flow of cooling fluid to the mold, the regulator opening and closing in response to the control signal to regulate the flow of cooling fluid to the mold. A method for controlling the temperature of a fluid-cooled mold includes the steps of injecting liquid plastic into the mold, sensing the temperature of the mold, and responding to the sensed temperature by passing cooling fluid through the mold when the sensed temperature is above a selected control temperature and cutting off the flow of cooling fluid below the control temperature. In this manner the mold can be heated to and maintained at the desired working temperature using a cooling fluid the temperature of which need not be elevated to or maintained at the ideal working temperature of the mold.

A second object of the invention is to provide for the cooling of a fluid-cooled mold without the need for a continuous flow of fluid, thereby reducing the consumption of fluid and allowing ordinary tap water to be intermittantly passed through the mold to cool it.

In addition, the mold is elevated in temperature by heat from molten plastic within the mold, so that no additional heaters are required; thus, energy consumption is substantially lower than in conventional systems which heat the circulating fluid and pump the fluid through the mold.

Other objects, features, and advantages of the invention will be apparent from the following detailed description taken in conjunction with the accompanying drawings showing a preferred embodiment of an apparatus for mold temperature control exemplifying the principles of the invention.

BEST MODE FOR CARRYING OUT THE INVENTION

Figure 1:
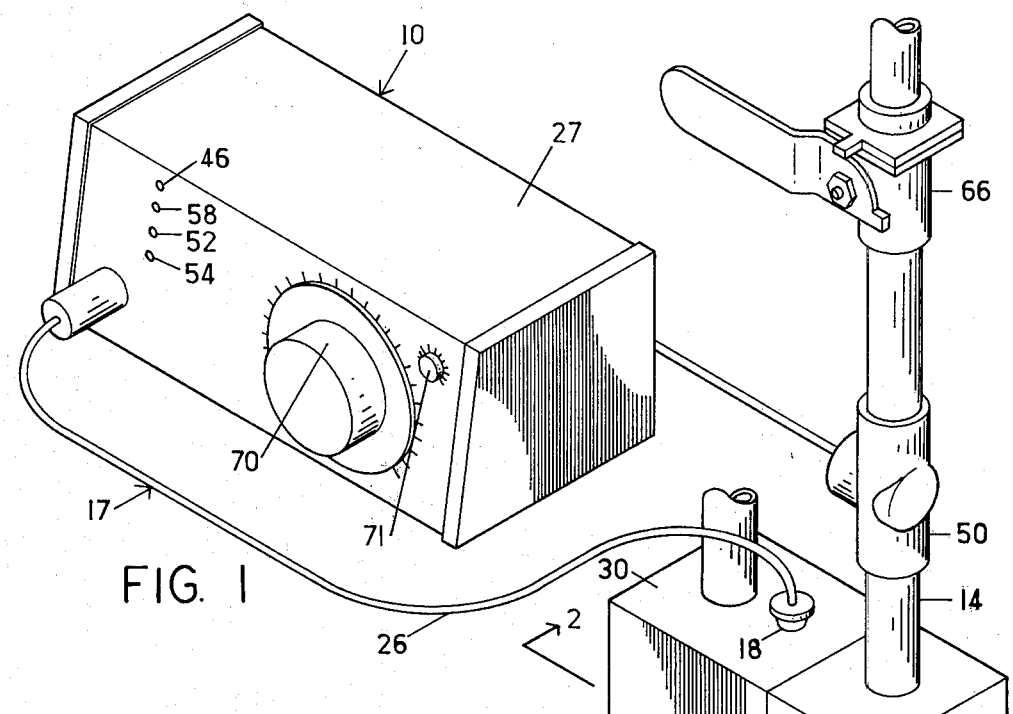
FIG. 1 is a perspective view of an apparatus for mold temperature control constructed in accordance with the present invention, shown in association with a mold.

Referring more particularly to the drawings, wherein like numbers refer to like parts, FIG. 1 shows an apparatus for mold temperature control, generally indicated at 10, constructed in accordance with the present invention.

Figure 2:
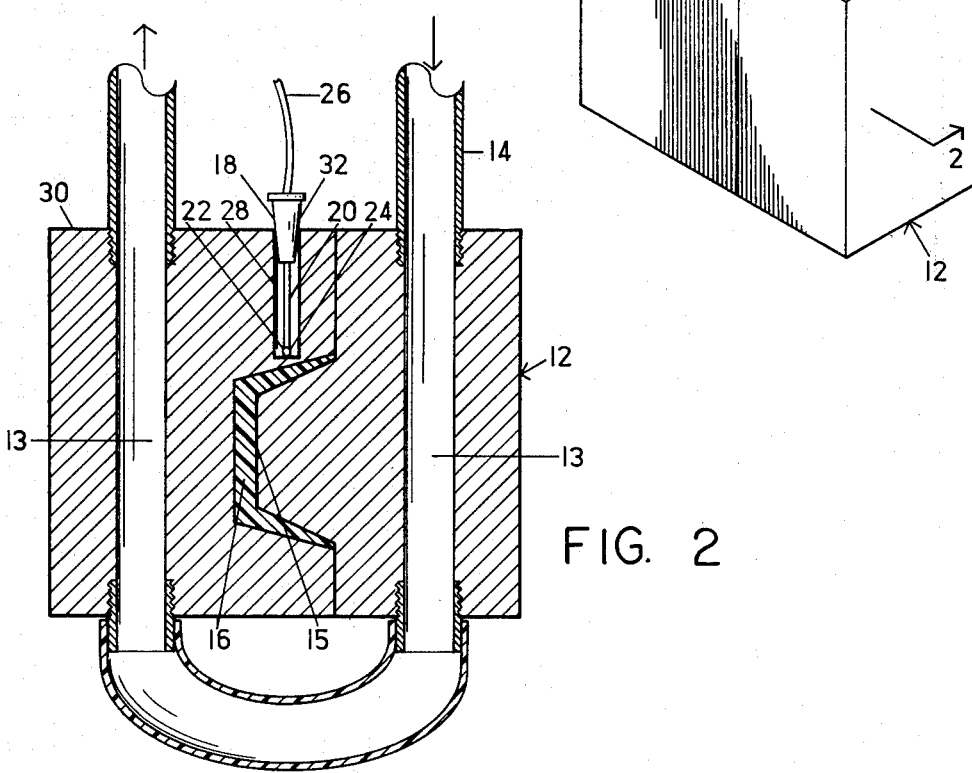
FIG. 2 is a cross-sectional view of the mold of FIG. 1 taken along section lines 2—2 of FIG. 1.

The mold temperature controller 10 is used in conjunction with a fluid-cooled mold, shown generally at 12 in an illustrative construction, although it is apparent that many different mold configurations may be utilized. As shown in the cross-sectional view of FIG. 2, the mold 12 has internal surfaces defining cooling channels 13 which pass through the mold 12 in locations selected to allow fluid flowing through the channels to efficiently absorb heat from the mold. A source of cooling fluid, such as the water pipe 14, is connected with the channels 13 by any convenient means. The cooling liquid may be exhausted or recycled through a cooling tower to dissipate the heat absorbed from the mold, or, if ordinary tap water is used, the water passed through the mold may simply be drained to a sewer system. The mold 12 also has internal surfaces defining a mold cavity 15 adapted to receive an injection or "shot" of molten thermoplastic 16 to be cooled and thereby "set" or "cured" to form the object to be molded.

The mold temperature controller 10 has a temperature sensor 17 to provide a means for sensing and conveying information about the temperature of the mold 12. In the embodiment shown in FIG. 2, the temperature sensor 17 includes a probe 18 having a resilient shank 20 containing electrical leads and a contact head 22 formed of a heat and abrasion resistant material such as epoxy located at an end of the shank which houses a thermistor 24 (not shown in FIG. 2). An insulated electrical lead 26, a portion of which may serve as the shank 20, extends from the thermistor 24 back to a case 27 which houses the electrical components of the controller.

Internal surfaces in the mold 12 define a probe well 28 which extends inwardly from an external surface 30 toward the cavity 15 for a selected distance such that the bottom of the probe well is separated from the cavity by a relatively thin wall of metal (e.g., 4 mm). The probe well 28 is adapted to receive the shank 20 of the temperature probe 18 with the contact head 22 touching the bottom of the probe well. The temperature probe 18 is secured in the probe well 30 such that the contact head 22 of the probe remains in firm contact with the bottom of the probe well 28 with the shank slightly bent. In the preferred embodiment, the probe 18 is secured in the well by a frustum shaped sleeve 32, made of a compressible and resilient material, such as rubber or a resilient plastic, which surrounds a portion of the shank 20 and is adapted to frictionally engage the walls of the well 28.

Preferably, the probe well 28 extends to a point adjacent to that part of the mold 12 which becomes hottest when the mold is injected with molten plastic—usually an injection sprue or other part of the cavity 15 near to the point at which the shot of molten plastic is injected into the cavity. For example, the contact head 22 of the temperature probe 18 will preferably be located within approximately 2.5 mm of the hottest accessible area of the cavity 15. By locating the probe in this manner, the thermistor 24 can provide a signal that varies with the temperature of the hottest part of the mold 12.

Figure 3:
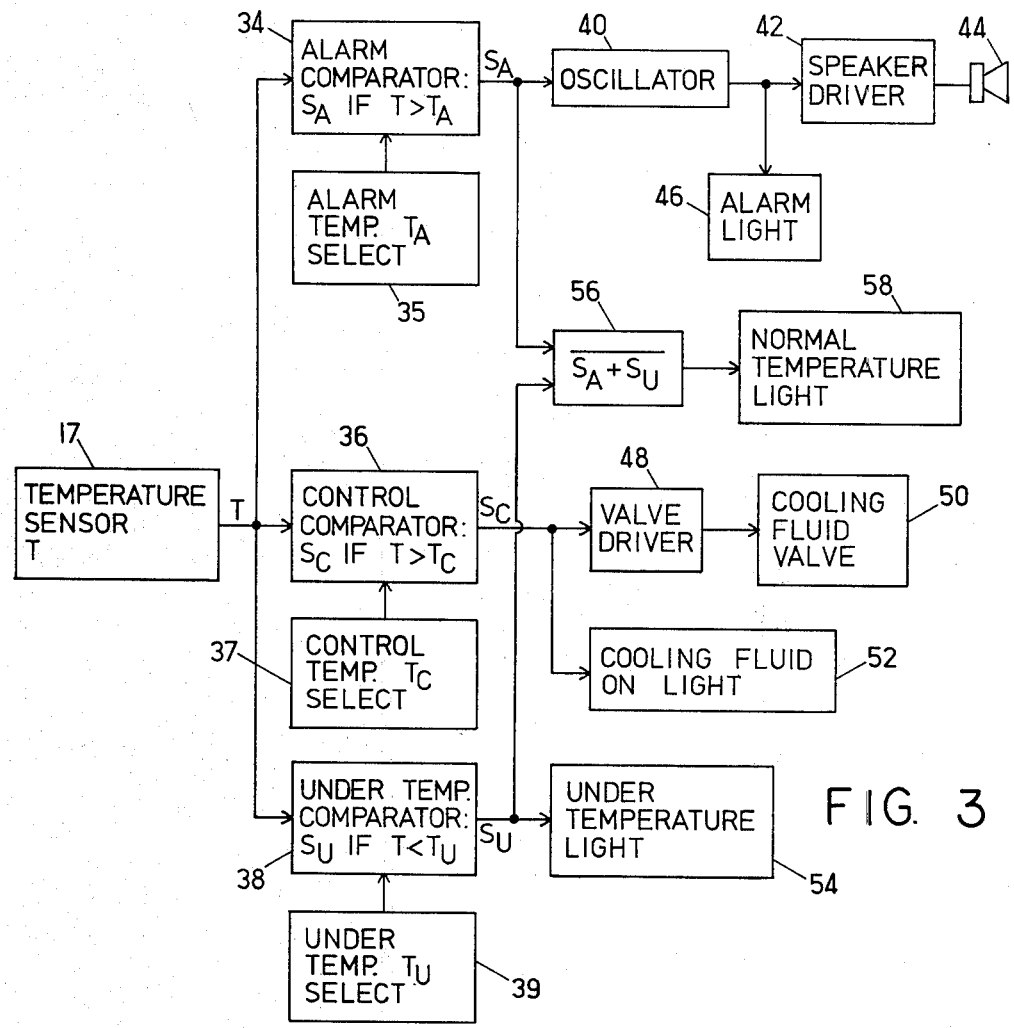
FIG. 3 is a schematic block diagram showing the fundamental functional elements of the mold temperature controller of FIG. 1 and their relationship to one another.

The mold temperature controller 10 includes means for responding to the information about the temperature of the mold 12 provided by the sensor 17 and means for generating an appropriate control signal when the temperature sensed exceeds a selected maximum. In the preferred embodiment, the signal from the temperature sensor 17 is conveyed to three comparators, as illustrated by reference to the block diagram view of FIG. 3. A first alarm comparator 34 provides an alarm signal $S_a$ if the information conveyed from the temperature sensor indicates that the mold 12 is at a temperature T in excess of a selected alarm temperature level $T_a$ provided by an alarm temperature selector 35. A second control comparator 36 provides a control signal $S_c$ if the temperature sensor indicates that the temperature of the mold 12 exceeds a selected control temperature level $T_c$ provided by a control temperature selector 37. A third undertemperature comparator 38 provides an under temperature signal $S_u$ if the temperature indicated by the temperature sensor is less than a selected minimum operating temperature level $T_u$ provided by an under temperature selector 39.

In the event that the first comparator 34 provides an alarm signal $S_a$, the alarm signal is received by and triggers an oscillator 40. The output of the oscillator 40 is received by an alarm driver 42 that drives a speaker 44 to emit an audible alarm. The output from the oscillator 40 is also received by an alarm light 46 which is conveniently located so as to be observable by the operator of the mold 12.

If the temperature T is such that the second comparator 36 provides a control signal $S_c$, the control signal is received by a valve driver 48 that provides power to open a cooling fluid valve 50 and thereby release a flow of cooling fluid to the mold 12. In the preferred embodiment, the control signal $S_c$ provided by the second comparator 36 is also received by a cooling fluid on light 52, mounted on the face of the controller case 27 where it may be observed conveniently by the operator.

If the temperature is below the minimum temperature $T_u$, such that the third comparator 38 provides a low temperature warning signal $S_u$, the warning signal is provided to an under temperature light 54. The under temperature signal $S_u$ and the over temperature signal $S_a$ are provided to a logic circuit 56 which provides an output signal to drive a normal temperature light 58 when the signals $S_a$ and $S_u$ are both absent or "low." If either of the signals $S_a$ or $S_u$ are present or "high," the normal temperature light 58 will be off. The presence of this light thus provides a positive indication to the operator that the controller is working properly.

When an apparatus for mold temperature control constructed in accordance with the present invention is used to control the temperature of a fluid-cooled mold, the following events and steps generally occur. Before the first injection of molten thermoplastic, the mold 12 is typically cooler than the desired operating temperature. With each injection of plastic, the temperature of the mold increases. Usually three or four injections of plastic are sufficient to heat the mold to the desired operating temperature, the objects molded as a consequence of these start-up injections being discarded. In the representative graphical plot of mold temperature against time shown in FIG. 5, the temperature of the mold may be seen to increase with each injection of plastic, taken to occur at points 62 on the graph. A temperature $T_u$ is selected that is at the minimum desired operating temperature for the mold 12, and the third comparator 38 is adjusted to provide a signal $S_u$ so long as the temperature T of the mold 12 remains below $T_u$. Consequently, as set forth above, the under temperature light 54 remains on until T equals or exceeds $T_u$. Similarly, the normal temperature light 58 remains off so long as T is less than $T_u$.

At some point as molten plastic is repeatedly injected into the mold 12, the measured temperature T of the mold 12 will exceed the desired operating temperature. A temperature $T_c$ is selected being either the same or slightly higher than the preferred operating temperature. The second comparator 36 is adjusted to provide a control signal $S_c$ when the temperature of the mold T exceeds $T_c$. As explained above, the signal $S_c$ causes the valve driver 48 to open the cooling fluid valve 50 and cause cooling fluid to pass through the cooling channels 13. When the temperature of the mold 12 has been reduced beneath the control temperature $T_c$, the second comparator 36 ceases to provide the control signal $S_c$, and the flow of cooling fluid is turned off. The cooling fluid on light 52, being activated by the control signal $S_c$, remains on so long as the cooling fluid is passing through the mold.

Figure 5:
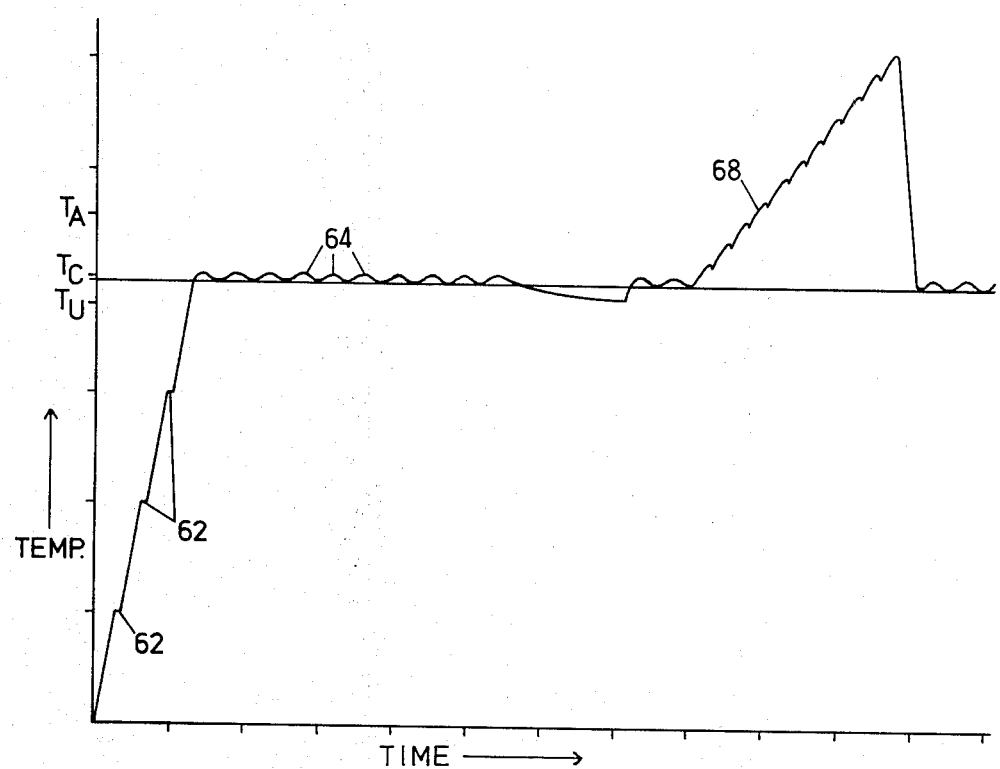
FIG. 5 is an illustrative graph showing typical temperature changes in a mold during successive injections of molten plastic.

With each successive injection of molten plastic, the temperature of the mold 12 usually is observed to rise above the control temperature $T_c$, causing the second comparator 36 to activate the valve driver 48 and cooling fluid on light 52, in the manner described above. A typical pattern of temperature change during such a series of molten plastic injections is shown in FIG. 5 at 64. The temperature T rises above the control temperature $T_c$ for a brief period of time until the flow of cooling fluid reduces the temperature to the control temperature once again. Because the cooling fluid may be selected to be considerably cooler than the desired operating temperature, the time necessary to restore the mold 12 to the operating temperature after each injection of molten plastic may be relatively brief, allowing for the efficient use of the mold, which is ready for the next injection of plastic as soon as the last has been set and ejected from the mold. It will be apparent that the use of cooling fluid having a temperature considerably below the desired operating temperature allows for a swifter cooling of the mold 12 than could be accomplished with a comparable flow of cooling fluid maintained at the operating temperature, as is conventionally done. If, for some reason, it is desired to slow the cooling of the mold 12, means for limiting the flow rate of cooling fluid may be employed, such as the adjustable valve 66. The valve 66 is adapted to close the water pipe 15 to a selected extent.

Should the flow of cooling fluid be insufficient to cool the mold 12, the temperature of the mold will rise with each succeeding injection of plastic, as indicated at 68 in FIG. 5. A failure of cooling fluid flow, selection of too slow a flow rate, or too frequent injections of plastic may all lead to this result. Should the temperature of the mold 12 exceed a selected alarm temperature $T_a$, the first comparator 34 emits an alarm signal $S_a$ as described above, activating the oscillator 40 and, in turn, the alarm light 46 and the speaker drive 42. The visual alarm from the alarm light 46 and the audible alarm from the speaker 44 warn the operator to take appropriate action to reduce the temperature of the mold to the desired operating temperature.

It is preferred that the control temperature level $T_c$ provided to the second comparator 36 be adjustable to accommodate differing mold rates, mold geometries, plastic materials, and so forth. In the embodiment of the controller shown in FIG. 1, a control knob 70 mounted on the case of the controller is connected to vary the temperature level $T_c$ at which the comparator 36 switches. Indicia on the case allow the control temperature $T_c$ to be correlated to various positions of the knob. In a preferred embodiment of the controller, the under temperature level $T_u$ is automatically set at a selected number of degrees beneath the control temperature $T_c$ and the alarm temperature $T_a$ likewise varies automatically with $T_c$. A separate temperature control knob 71 is preferably provided whereby the amount by which the alarm temperature $T_a$ exceeds the control temperature $T_c$ and the amount by which the under temperature $T_u$ is lower than the control temperature may be adjusted to reflect the operating tolerances desired.

Figure 6:
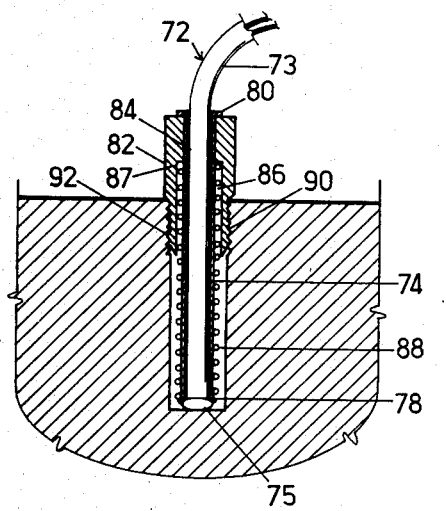
FIG. 6 is a cross-sectional view taken along the longitudinal centerline of an alternative embodiment of a temperature probe shown illustratively placed in a mold.

An alternative embodiment of a temperature probe suitable for use with the controller of the invention is shown generally in FIG. 6 at 72. An insulated lead 73 is contained within and extends from one end of a cylindrical tube 74 that extends for substantially the length of the spring-loaded probe 72. A contact head 75 is located at the end of the insulated lead 73, and contains a thermistor (not shown in FIG. 6). The tube 74 has a first flared retaining ring 78 formed on its end adjacent to the contact head 75 and a second retaining ring 80 extends annularly outwardly from the other end of the tube 74.

A hub 82 has internal surfaces defining a cylindrical slide passage 84 sized to slideably engage the tube 74 and a cylindrical spring well 86 co-axial with and having a larger diameter than the slide passage. A radially extending surface extends between the slide passage 84 and the spring well 86 to form a spring seat 87. A helical spring 88 surrounds and extends co-axially with the containing tube 74 and is received by the spring well 86. One end of the spring 88 presses against the spring seat 87, and the other end of the spring presses against the first retaining ring 78, thus biasing the contact head 75 away from the hub 82. The containing tube 74 is retained within the slide passage 84 by the second retaining ring 80.

When adapted for use with the spring-loaded probe 70, the walls 90 of the probe well 30 are threaded, as shown in FIG. 5. Exterior threads 92 on the hub 82 are adapted to threadedly engage the threads 90 of the probe well 30, securely fastening the spring-loaded probe 70 in place. The containing tube 74 is of a length selected to reach the bottom of the probe well 30, and the spring 88 biases the contact head 75 firmly against the bottom.

Figure 7:
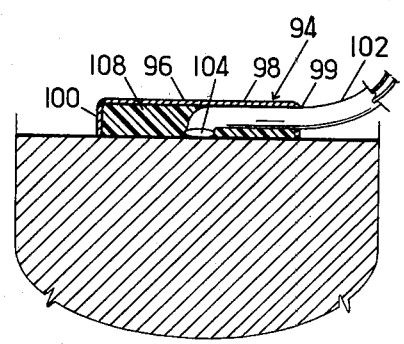
FIG. 7 is a cross-sectional view taken along the longitudinal centerline of a second alternative embodiment of a temperature probe shown placed on a mold.

A third embodiment of a temperature probe is shown generally at 94 in FIG. 7. The magnetic probe 94 has a casing 96 made of magnetized ferromagnetic material having a disc-shaped back 98 and a circular side wall 100 depending for a selected distance from the periphery of the back 98. The casing 96 has a port 99 and an insulated electrical lead 102 which extends through the lead port and into the interior of the casing 96. The lead 102 terminates in a contact head 104, facing away from the back 98, which contains a thermistor (not shown). Filler material 108, such as epoxy, fills the casing 96 and secures the lead 102 and contact head 104 within the casing. The temperature probe 94 can be applied to any convenient external surface of a mold and, if the mold is made of ferromagnetic materials, will be held in place by the magnetized casing 96.

The probe 94 is useful for monitoring the temperature of molds where the walls are fairly thin or where it is not desirable to drill a hole into the mold. Although the contact point and thermistor may not be in close proximity to the mold cavity, the cooling temperature $T_c$ can be adjusted to initiate cooling at a lower sensed temperature than that existing at the walls of the mold cavity.

Figure 4:
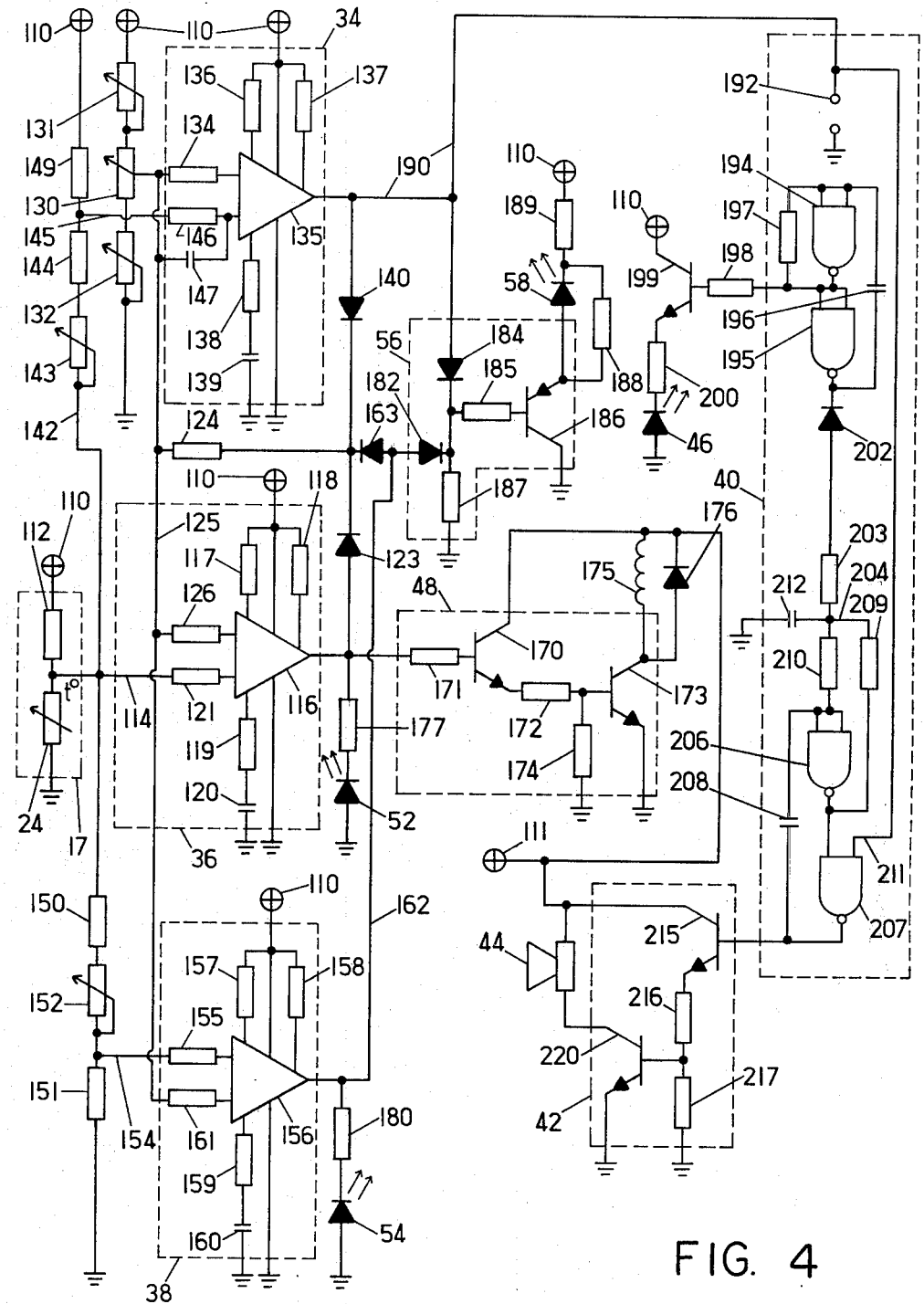
FIG. 4 is a schematic circuit diagram of a portion of the electrical circuitry of the mold temperature controller of FIG. 1.

The comparators 34, 36, and 38, oscillator 40, speaker driver 42, valve driver 48, and logic circuit 56 may be implemented with conventional electronic circuitry and an exemplary preferred embodiment of such circuitry is shown in the schematic circuit diagram of FIG. 4. Any suitable, conventional speaker and lights may be used for the speaker 44 and the alarm light 46, cooling fluid on light 52, under temperature light 54, and normal temperature light 58. In the preferred embodiment, a conventional, solenoid activated fluid valve is employed as the cooling fluid valve 50.

An illustrative embodiment of the electronic circuitry of the controller portion of the apparatus is shown in schematic form in FIG. 4. Regulated DC power is supplied to the circuit from standard power supply circuitry (not shown) to power take-off points illustrated schematically at 110 in FIG. 4. Unregulated rectified DC power is supplied to the power take-off point 111 and is used to drive the speaker 44 and the solenoid operated valve 50. The temperature of the mold is sensed by the thermistor 24 which forms part of a voltage divider with a second resistor 112, with the thermistor varying in resistance with the temperature of the mold. As a result, the voltage on the line 114 between the thermistor 24 and the resistor 112 will vary in relation to the temperature of the mold. This voltage is passed to the first comparator 36 which consists of a differential operational amplifier 116 with associated biasing resistors 117–119 and a capacitor 120. The voltage on the line 114 is fed to the negative differential input of the operational amplifier 116 through an input resistor 121. The output of the amplifier 116 is passed through a diode 123, a feedback resistor 124, a connecting line 125 and a second input resistor 126 to the positive differential input of the amplifier. An adjustable reference voltage input is provided by tapping off a potentiometer 130 connected between variable resistors 131 and 132, all of which are connected between the reference voltage and ground. The resistance of the three resistors 130, 131 and 132 is varied by turning the dial 70 on the face of the unit. Adjustment of these resistors changes the temperature level $T_c$ at which the comparator 36 will switch states.

The output of the potentiometer 130 is also presented to the first comparator 34 at an input resistor 134 connected to the positive following input of a differential operational amplifier 135, which is biased by resistors 136, 137, and 138 and a capacitor 139. The output of the operational amplifier 135 is also fed back through a diode 140 and through the resistor 124 to the line 125 and thence to the input resistor 134. The voltage from the thermistor 24 is provided on a conducting line 142 through a variable resistor 143 and a fixed resistor 144 to an input line 145 leading to a resistor 146 which is connected to the negative input of the operational amplifier 135. A compensation capacitor 147 is connected between the negative input of the amplifier and the conducting line 125. An offset voltage of constant value is also presented on the line 145 from the voltage divider formed between a resistor 149 connected to the regulated DC power source and through the resistors 143 and 144 to the conducting line 142 and thence through fixed resistors 150 and 151 and a variable resistor 152 to ground. The variable resistors 143 and 152 are ganged together and are operated by the alarm temperature knob 71 on the face of the unit. Variation of these resistors thus provides a means to change the spread of degrees of temperature between the normal operating temperature of the device and the temperature $T_a$ at which the over temperature alarm is triggered or the temperature $T_u$ at which the under temperature indicator is activated.

The variation in resistance of the thermistor 24 appears as a variation in voltage on a conducting line 154 between the resistors 151 and 152, and this voltage is passed through an input resistor 155 to the positive input of an operational amplifier 156 within the third comparator circuit 38. The amplifier 156 has biasing resistors 157, 158, and 159 and a biasing capacitor 160. The reference voltage on the line 125 is provided to the negative input of the amplifier 156 through an input resistor 161. The output of this amplifier is directed on a line 162 through a diode 163 and thence back through the feedback resistor 124 and the line 125 to the input resistor 161.

It will be seen that the feedback of the output signals from all three of the operational amplifiers 116, 135 and 156, through the respective diodes 123, 140 and 163 and the feedback resistor 124, provides stabilizing feedback for each of these amplifiers so that the amplifiers do not saturate when they are turned on. When the negative input of each of the differential amplifiers exceeds the positive input, each amplifier attempts to draw down its output and will essential stabilize at a zero output voltage level very quickly.

The output of the operational amplifier 116 and the comparator 36 is provided to the valve driver circuit 48. This circuit includes a first transistor 170 which receives the output of the amplifier 116 through a base resistor 171 and which has the emitter thereof connected through a coupling resistor 172 to the base of a second power transistor 173. A biasing resistor 174 is also connected between the base of the power transistor 173 and ground. The collector of the first transistor 170 is connected directly to the power source 111 whereas the power transistor 173 has the solenoid coil 175 of the solenoid operated cooling fluid valve 50 connected between the power source and its collector. A free wheeling diode 176 is connected across the solenoid 175 to conduct inductive transient current from the solenoid during the time immediately after the transistor 173 is turned off. The solenoid 175 will not be activated as long as the negative input provided through the resistor 121 to the amplifier 116 is greater than the corresponding reference voltage provided through the resistor 126 to the amplifier, during which time the output of the amplifier is low and the transistors 170 and 173 are turned off. A decrease in the resistance of the thermistor 24 with increasing temperature will, at a selected point, cause the operational amplifier 116 to be switched to its stablized high level which will drive the transistors 170 and 173 on and pass current through the solenoid 175. A light emitting diode 52 is connected to the output of the amplifier 116 through a resistor 177 and lights when the control valve is on to so inform the operator.

The output of the under temperature comparator 38, from the differential amplifier 156, is also passed through a resistor 180 to a light-emitting diode which serves as the under temperature light 54.

The outputs of the comparators 34 and 38 are also passed to the logic circuit 56 which performs a NOR function on the signals. The particular logic circuit illustrated employs diodes 182 and 184 transmitting the outputs of the amplifiers 156 and 135, respectively, to a common node connected through a resistor 185 to the base of a PNP transistor 186. This transistor is turned off as long as either one of the outputs of the amplifiers 135 or 136 is high. If the outputs of both of these amplifiers are low—indicating that the mold is operating within the normal temperature range—then the base current flowing through a biasing resistor 187 is sufficient to turn the transistor 186 on and pass current through the light-emitting diode which acts as the normal temperature indicator light 58. A by-pass resistor 188 and a series resistor 189 are provided to properly control the current passing through the indicator light 58.

When an alarm condition is sensed, the amplifier 135 will put out a "high" signal on its output line 190. The particular circuit shown in FIG. 4 provides an alternating frequency warning signal through the speaker 44 which is more likely to alert the operator to the alarm condition than a steady tone. The example of such a circuit shown in FIG. 4 utilizes currently available integrated circuit packages, with one suitable type being an MC 14011 quad NAND gate package. The signal on the line 190 is supplied to the power supply terminals 192 of this integrated circuit package to enable the devices thereon only during the time that the amplifier 135 is providing an alarm output. This activates an astable multivibrator formed of two NAND gates 194 and 195, a feedback capacitor 196 and a charging resistor 197. The relative sizes of the capacitor 196 and the resistor 197 are chosen such that the oscillating signal from the astable has a relatively long period, in the range of one second. The output of the first NAND gate 194 is delivered through a coupling resistor 198 to a transistor 199 which, when turned on, supplys current through a resistor 200 to a light-emitting diode serving as the alarm light 46. This alarm light will thus flash on and off approximately at one second intervals during the alarm condition.

The output of the second NAND gate 195 is passed through a diode 202 and a resistor 203 to a common node 204 which is connected to the input of a second astable multivibrator. This second multivibrator includes two additional NAND gates 206 and 207, a feedback capacitor 208, and charging resistors 209 and 210. The NAND gates 206 and 207 are again enabled only when a high signal is provided on the line 190, and, in addition, the signal on the line 190 is provided through a connecting line 211 to one of the two inputs of the NAND gate 207, thus insuring that an oscillating output is provided from this NAND gate only during the alarm condition. The frequency of oscillation will be determined by the relative sizes of the resistors 203, 209 and 210 and the capacitor 208. The change in the oscillation frequency occurs when the output of the NAND gate 195 switches: when the output of this gate is high, the output voltage is blocked by the diode 202 and the resistor 203 is essentially removed from the circuit; thus, the time constant of the charging rate of the capacitor 208 will be determined entirely by the values of the resistances of the resistors 209 and 210; conversely, when the output of the NAND gate 195 is low, the current flowing through the resistor 209 will flow through the resistor 203 and the diode 202, thereby reducing the rate at which the capacitor 208 charges, and thus lowering the frequency of oscillation. A compensation capacitor 212 may be connected in the circuit as shown between the common node 204 and ground to improve the switching characteristics.

The oscillating output of the NAND gate 207 is provided to the base of a first transistor 215 within the speaker driver 42. The emitter of this transistor is connected through biasing resistors 216 and 217 to a power transistor 220 which has the speaker 44 connected between the source of unregulated DC power 111 and the collector of the transistor 220. The frequency of oscillation of the oscillator formed by the two NAND gates 206 and 207 is chosen to be in the audio frequency range, e.g. 1,000 Hz, with the two frequencies of oscillation being perhaps an octave apart to allow them to be readily distinguished by the operator.

It is understood that the invention is not confined to the particular construction, materials, and arrangement of parts herein illustrated and described, but embraces all such modified forms thereof as come within the scope of the following claims.

What is claimed is:

1. A mold temperature controlling apparatus for a fluid cooled mold, comprising:
   (a) temperature sensor means adapted to be mounted to a mold for providing an output signal indicative of the temperature of the mold, the temperature sensor means including a temperature probe having a thermistor adapted to contact the mold, a resilient shank containing electrical leads and having a contact head at its end which houses the thermistor, and a frustum shaped sleeve of resilient material which surrounds the shank and is adapted to be wedged into a well formed in a mold to thereby hold the probe firmly in position on the mold, the temperature sensor means also including circuit means for providing a bias current to the thermistor and a voltage signal across the thermistor;
   (b) means receiving the voltage signal across the thermistor indicative of the temperature of the mold and responsive thereto for providing a control signal when the temperature sensed exceeds a selected control temperature; and
   (c) flow control valve means, connected to receive the control signal and adapted to be connected in the flow of cooling fluid to the mold, for opening and closing in response to the control signal to provide a flow of cooling fluid to the mold when the sensed temperature exceeds the selected control temperature and to cut off the flow of cooling fluid when the sensed temperature drops below the selected control temperature.

2. A mold temperature controlling apparatus for a fluid cooled mold, comprising:
   (a) temperature sensor means adapted to be mounted to a mold for providing an output signal indicative of the temperature of the mold the temperature sensor means including a temperature probe having a thermistor adapted to contact the mold,
   a cylindrical tube having retaining rings formed on each end,
   an insulated electrical lead contained within and extending from one end of the tube, and having a contact head at its end located at the other end of the tube and which houses the thermistor,
   a hub having internal surfaces defining a cylindrical slide passage adapted to slideably engage and hold the tube, a spring well formed in the hub which is co-axial with and has a larger diameter than the slide passage, a spring seat formed as a radial surface in the hub between the slide passage and the spring well walls; and exterior threads formed on the hub which are adapted to threadingly engage a probe well in a mold which has mating threads, and
   a helical spring surrounding the tube and mounted in compression between the spring seat in the hub and the retaining ring formed on the end of the tube at which the contact head is located to thereby bias the tube and contact head away from the hub and toward firm contact with the bottom of a probe well in a mold to which the probe may be mounted, the temperature sensor means also including circuit means for providing a bias current to the thermistor and a voltage signal across the thermistor;
   (b) means receiving the voltage signal across the thermistor indicative of the temperature of the mold and responsive thereto for providing a control signal when the temperature sensed exceeds a selected control temperature; and (c) flow control valve means, connected to receive the control signal and adapted to be connected in the flow of cooling fluid to the mold, for opening and closing in response to the conrol signal to provide a flow of cooling fluid to the mold when the sensed temperature exceeds the selected control temperature and to cut off the flow of cooling fluid when the sensed temperature drops below the selected control temperature.

3. A mold temperature controlling apparatus for a fluid cooled mold, comprising:

(a) temperature sensor means adapted to be mounted to a mold for providing an output signal indicative of the temperature of the mold the temperature sensor means including a temperature probe having a thermistor adapted to contact the mold, a casing made of magnetized ferromagnetic material having a disc shaped back and a circular sidewall depending from the periphery of the back, and a port formed in the casing, an insulated electrical lead extending through the port into the interior of the casing and terminating in a contact head which contains the thermistor, filler material filling the interior of the casing and securing the lead and the contact head therein, the temperature sensor means also including circuit means for providing a bias current to the thermistor and a voltage signal across the thermistor;

(b) means receiving the voltage signal across the thermistor indicative of the temperature of the mold and responsive thereto for providing a control signal when the temperature sensed exceeds a selected control temperature; and (c) flow control valve means, connected to receive the control signal and adapted to be connected in the flow of cooling fluid to the mold, for opening and closing in response to the control signal to provide a flow of cooling fluid to the mold when the sensed temperature exceeds the selected control temperature and to cut off the flow of cooling fluid when the sensed temperature drops below the selected control temperature.

4. A mold temperature controlling apparatus for a fluid cooled mold, comprising:

(a) temperature sensor means adapted to be mounted to a mold for providing an output signal indicative of the temperature of the mold;

(b) means responsive to the signal indicative of the temperature of the mold for providing a control signal when the temperature sensed exceeds a selected control temperature; and (c) flow control valve means, adapted to be connected in the flow of cooling fluid to the mold and connected to receive the control signal, for opening and closing in response to the control signal, the flow control valve means opening to provide a flow of cooling fluid to the mold when the sensed temperature exceeds the selected control temperature and the control signal is present and closing to cut off the flow of cooling fluid when the sensed temperature drops below the selected control temperature and the control signal is removed.

5. Improved plastic injection molding apparatus of the type having a mold body, walls within the mold body defining a mold cavity into which liquid plastic material is injected, and walls within the mold body defining channels through which a cooling fluid may be passed, the improvement comprising:

(a) temperature sensor means, mounted to the mold body in position to sense the temperature thereof, for providing an output signal indicative of the temperature of the mold;

(b) means responsive to the signal indicative of the temperature of the mold for providing a control signal when the temperature sensed exceeds a selected control temperature; and (c) flow control valve means, connected to deliver cooling fluid to the channels in the mold and also connected to receive the control signal, and being adapted to be connected to a source of cooling fluid under pressure, for opening and closing in response to the control signal, the flow control valve means opening to provide a flow of cooling fluid to the mold when the sensed temperature exceeds the selected control temperature and the control signal is present and closing to cut off the flow of cooling fluid when the sensed temperature drops below the selected control temperature and the control signal is removed.

6. The apparatus of claim 4 or 5 including means connected to receive the control signal and responsive thereto for providing a signal to the operator when the control signal is present and cooling fluid is thereby flowing to the mold.

7. The apparatus for claim 4 or 5 including a variable flow regulating valve connected in the flow of cooling fluid to the mold to allow the flow rate of cooling fluid to be adjusted to a selected maximum rate.

8. The apparatus of claim 1 or 2 including means responsive to the signal indicative of the temperature of the mold for providing a warning signal to the operator of the mold when the temperature sensed exceeds a preselected alarm temperature which is higher than the control temperature.

9. The apparatus of claim 4 or 5 including means responsive to the signal indicative of the temperature of the mold for providing a warning signal to the operator of the mold when the temperature sensed is less than a preselected under temperature level which is less than the control temperature.

10. The apparatus of claim 4 or 5 wherein the temperature sensor means includes a temperature probe having a thermistor adapted to contact the mold and circuit means for providing a bias current to the thermistor and for transmitting the voltage signal across the thermistor to the means responsive to the signal indicative of the temperature of the mold.

11. The apparatus of claim 10 including an under temperature comparator having two inputs, a first of the inputs being connected to receive the voltage signal across the thermistor, means for applying an adjustable voltage level to the second of the comparator inputs such that the comparator output will switch states when the voltage at its first input is lower than the voltage at its second input, whereby the voltage level applied to the second input of the under temperature comparator may be adjusted such that the comparator switches states when the temperature of the thermistor is below a selected minimum temperature, and an under temperature warning light connected to the output of the under temperature comparator.

12. The apparatus of claim 10 wherein the temperature probe comprises:
   (1) a resilient shank containing electrical leads and having a contact head at its end which houses the thermistor;
   (2) a frustum shaped sleeve of resilient material which surrounds the shank and is adapted to be wedged into a well formed in a mold to thereby hold the probe firmly in position on the mold.

13. The apparatus of claim 10 wherein the temperature probe comprises:
   (1) a cylindrical tube having retaining rings formed on each end;
   (2) an insulated electrical lead contained within and extending from one end of the tube, and having a contact head at its end located at the other end of the tube and which houses the thermistor;
   (3) a hub having internal surfaces defining a cylindrical slide passage adapted to slideably engage and hold the tube, a spring well formed in the hub which is co-axial with and has a larger diameter than the slide passage, a spring seat formed as a radial surface in the hub between the slide passage and the spring well walls; and exterior threads formed on the hub which are adapted to threadingly engage a probe well in a mold which has mating threads; and
   (4) a helical spring surrounding the tube and mounted in compression between the spring seat in the hub and the retaining ring formed on the end of the tube at which the contact head is located to thereby bias the tube and contact head away from the hub and toward firm contact with the bottom of a probe well in a mold to which the probe may be mounted.

14. The apparatus of claim 10 wherein the temperature probe comprises:
   (1) a casing made of magnetized ferromagnetic material having a disc shaped back and a circular sidewall depending from the periphery of the back, and a port formed in the casing;
   (2) an insulated electrical lead extending through the port into the interior of the casing and terminating in a contact head which contains the thermistor; and
   (3) filler material filling the interior of the casing and securing the lead and the contact head therein.

15. The apparatus of claim 10 wherein the means responsive to the signal indicative of temperature includes a control comparator having two inputs, a first of the inputs being connected to receive the voltage signal across the thermistor, means for applying an adjustable voltage level to a second of the comparator inputs such that the comparator output will switch states when the voltage at its first input is lower than the voltage at its second input, whereby the voltage level applied to the second input of the control comparator may be adjusted such that the comparator switches states when the temperature of the thermistor exceeds the selected maximum temperature.

16. The apparatus of claim 15 wherein the flow control valve includes a solenoid connected to a normally closed two-way valve connected in the cooling fluid flow path, and further including valve driver circuit means, connected to receive the output of the control comparator, for providing electrical power to the valve solenoid when the output of the control comparator is high.

17. The apparatus of claim 15 including an alarm comparator having two inputs, a first of the inputs being connected to receive the voltage signal across the thermistor, means for applying an adjustable voltage level to a second of the comparator inputs such that the comparator output will switch states when the voltage at its first input is lower than the voltage at its second input, whereby the voltage applied to the second input of the alarm comparator may be adjusted such that the comparator switches states when the temperature of the thermistor exceeds a selected alarm temperature, further including oscillator means, connected to receive the output signal from the alarm comparator, for providing an audio frequency signal output when the output of the alarm comparator is high, a speaker, and speaker driver circuit means receiving the output of the oscillator and providing a power signal at the oscillator frequency to the speaker.

18. The apparatus of claim 17 wherein the oscillator provides an output signal which alternates at a lower than audible frequency between two distinguishable audio frequencies.

19. The apparatus of claim 18 including an alarm warning light connected to the oscillator to receive power to turn it on and off as the oscillator alternates between output frequencies.

* * * * *

UNITED STATES PATENT AND TRADEMARK OFFICE
CERTIFICATE OF CORRECTION

PATENT NO. : 4,354,812

DATED : October 19, 1982

INVENTOR(S) : Horst K. Wieder, et al.

It is certified that error appears in the above-identified patent and that said Letters Patent are hereby corrected as shown below:

Col. 12, line 36 delete "1 or 2" and insert in its place --4 or 5--.

Signed and Sealed this

Twenty-first Day of December 1982

[SEAL]

Attest:

GERALD J. MOSSINGHOFF

Attesting Officer     Commissioner of Patents and Trademarks